Figure 1:
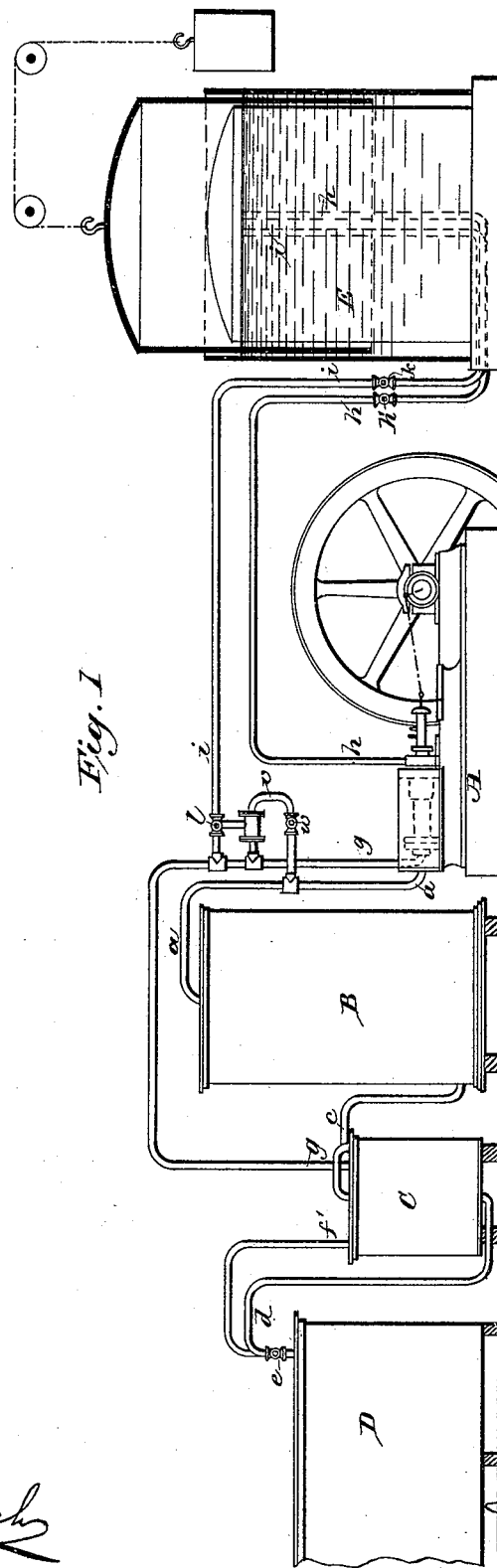

(No Model.)  3 Sheets—Sheet 1.

A. SCHMITZ.
PRODUCTION OF COLD AND MANUFACTURE OF ICE AND APPARATUS THEREFOR.

No. 336,952. Patented Mar. 2, 1886.

Attest
W. E. Poulter
P. M. Knobloch

Inventor
Albert Schmitz
per
Henry Orth
his atty

N. PETERS, Photo-Lithographer, Washington, D. C.

(No Model.) 3 Sheets—Sheet 2.

A. SCHMITZ.
PRODUCTION OF COLD AND MANUFACTURE OF ICE AND APPARATUS THEREFOR.

No. 336,952. Patented Mar. 2, 1886.

Attest
W. J. Buiter
O. M. Knobloch

Inventor
Albert Schmitz
per Henry Orth
his atty (No Model.) 3 Sheets—Sheet 3.

A. SCHMITZ.
PRODUCTION OF COLD AND MANUFACTURE OF ICE AND APPARATUS THEREFOR.

No. 336,952. Patented Mar. 2, 1886.

Attest
W. O. Coulter
P. M. Knobloch

Inventor
Albert Schmitz
per Henry Orth
his atty

UNITED STATES PATENT OFFICE.

ALBERT SCHMITZ, OF ESSEN-ON-THE-RUHR, ASSIGNOR TO WILHELM RAYDT, OF HANOVER, PRUSSIA, GERMANY.

PRODUCTION OF COLD AND MANUFACTURE OF ICE AND APPARATUS THEREFOR.

SPECIFICATION forming part of Letters Patent No. 336,952, dated March 2, 1886.

Application filed June 3, 1885. Serial No. 167,469. (No model.) Patented in Belgium November 24, 1884, No. 66,986; in France November 24, 1884, No. 165,545; in England November 24, 1884, No. 15,475; in Germany November 25, 1884, No. 33,168; in Italy December 19, 1884, XXXV, 22, XVIII, 17,595; in Austria-Hungary March 8, 1885, No. 44,353 and No. 10,842, and in Spain March 30, 1885, No. 4,658.

*To all whom it may concern:*

Be it known that I, ALBERT SCHMITZ, a subject of the King of Prussia, residing at Essen-on-the-Ruhr, Prussia, German Empire, have invented new and useful Improvements in the Production of Cold and the Manufacture of Ice and Apparatus Therefor, (for which Letters Patent have been obtained in Germany, No. 33,168, dated November 25, 1884; in Belgium, No. 66,986, dated November 24, 1884; in France, No. 165,545, dated November 24, 1884; in Great Britain, No. 15,475, dated November 24, 1884; in Italy, No. 22 and No. 17,595, dated December 19, 1884; in Austria-Hungary, No. 44,353 and No. 10,842, dated March 8, 1885, and in Spain, No. 4,658, dated March 30, 1885,) of which the following is a full, clear, and exact description.

This invention relates to machines for producing cold or manufacturing ice; and it has for its primary object the utilization of carbonic acid instead of ammonia and other readily-gasifiable or highly-volatile fluids heretofore used.

The invention consists, essentially, in structural changes and improvements of this class of machines to adapt them to the use of carbonic acid, substantially as hereinafter fully described, and as specifically pointed out in the claims.

The use of carbonic acid has the advantage of providing a more effective cooling agent than any of the fluids heretofore used, so that much smaller compressing-pumps may be employed for a given capacity of machine than with ammonia or other like fluids, the comparative dimensions being one to six—that is to say, a machine of given capacity in which ammonia or a like fluid is used as a cooling agent will require a corresponding pump of six times the size or capacity of the pump required for a machine of like capacity where the cooling agent is carbonic acid. A still greater advantage is, however, derived from the comparative low cost of carbonic acid as compared with the other volatile agents heretofore used, and this cost I have found to be one-twentieth that of ammonia, for example, under the same conditions, and this cost may be further reduced by preventing leakages. Furthermore, where ammonia and other like fluids are employed, leakages of the gases not only tend to render the ice impure, but also detrimentally affect the health of the operatives.

The general organization and construction of a machine adapted for use with carbonic acid depends, of course, on the high degree of tension of the resulting gases, which, according to the temperature of the cooling-water, may reach seventy-five atmospheres, so that carbonic acid could not be used in machines in which ammonia, sulphurous acid, or ether is employed as the refrigerating agent.

To prevent the loss of gases at the stuffing-boxes of the compressor, various improvements have been made, which in principle are based on the use of a twin stuffing-box with an intervening sealing-chamber, or a chamber wherein the escaping gases collect, and wherefrom they are removed by means of a special pump.

In my carbonic-acid ice-machine I have adopted the first construction, but do not maintain the liquid seal in the chamber at a pressure equal to the highest pressure in the pump. Nor do I conduct the escaping gases into the suction-chamber of the pump, as has been proposed; but I maintain the pressure at the liquid seal at about that of the atmosphere, in that I connect the chamber with a gas-holder into which the gases escaping through the sealing-chambers are collected.

The gases are removed from the holder by the pump whenever required, either by cutting out the refrigerator or by exhausting the same by means of an injector operated by carbonic-acid gas at a very high tension, and forcing the gases into the suction-chamber of the pump.

By the described means the liquid in the sealing-chamber may be kept at a comparatively low pressure—say about fifty millimeters, water-pressure—and consequently a very small stuffing-box can be employed, and without using mechanical devices for removing the escaping gases, or devices for distilling the sealing-fluid to recover the refrigerant absorbed thereby. On the other hand, where it is desirable to force the escaping gases from the stuffing-box chamber directly to the suction-chamber of the pump, it would require, owing to the high-suction tension of the pump, which is from twenty to twenty-five atmospheres, so high a pressure in the stuffing-box chamber as to necessitate a construction of stuffing-box substantially like those of the ordinary ammonia or ether or sulphurous-acid machines. It is obvious, therefore, that by means employed for removing the escaping gases the construction of the pump is materially simplified.

In the liquefaction of the carbonic-acid gas it is desirable that the temperature of the latter should be kept as low as possible, for the reason that the pressure required to liquefy the gas increases with the temperature of the latter. Thus, for instance, carbonic-acid gas at 0° will liquefy under a pressure of thirty-six atmospheres, while at 30° it requires seventy-three atmospheres to liquefy the gas.

To maintain the carbonic acid at as low a temperature as possible, with a view to correspondingly reduce its tension, I interpose between the condenser and refrigerator an apparatus in which the carbonic acid coming from the refrigerator is employed as a refrigerating medium for the carbonic acid, and said apparatus is also constructed to serve as a storage-chamber for a comparatively large volume of cold carbonic acid.

Figure 4:
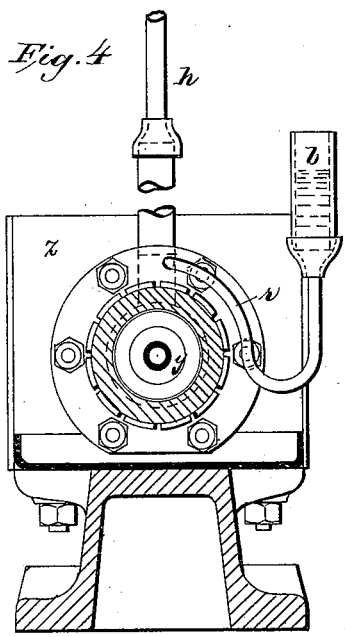
Figure 7:
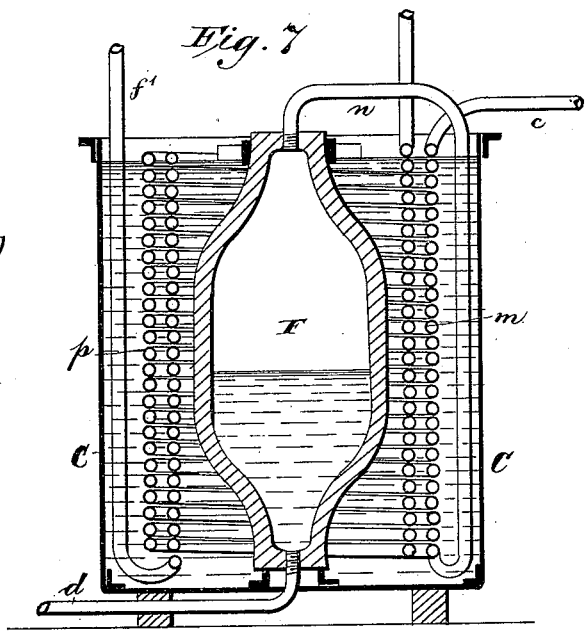
Figure 2:
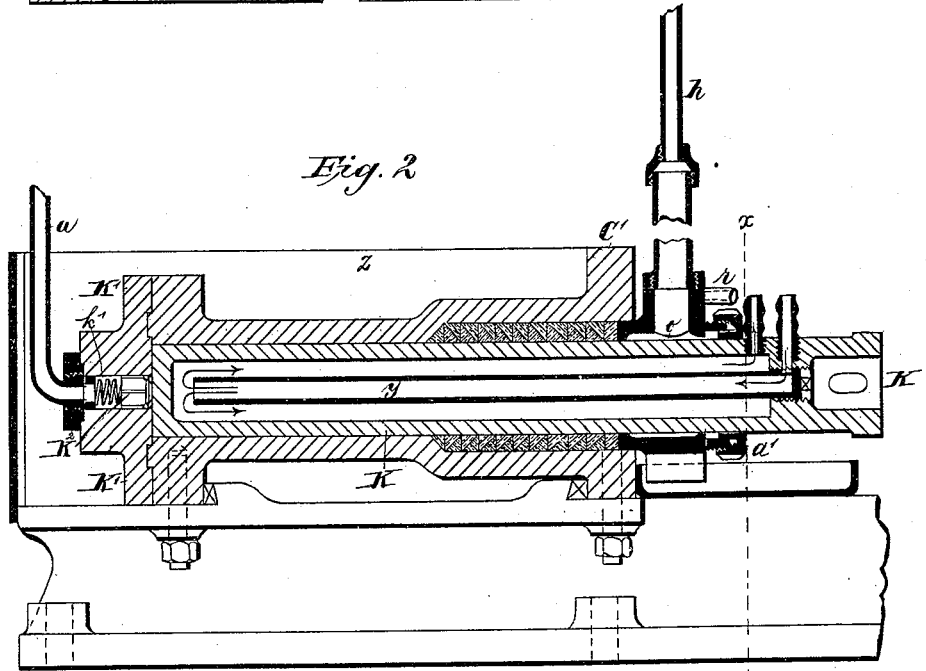
Figure 6:
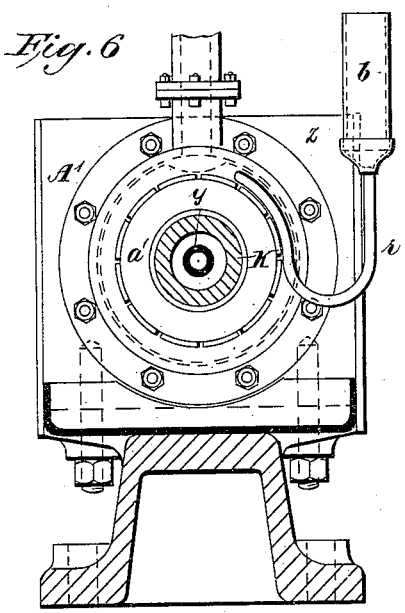
Figure 5:
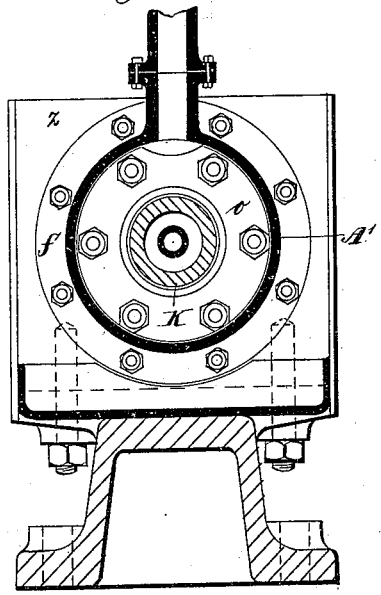
Figure 3:
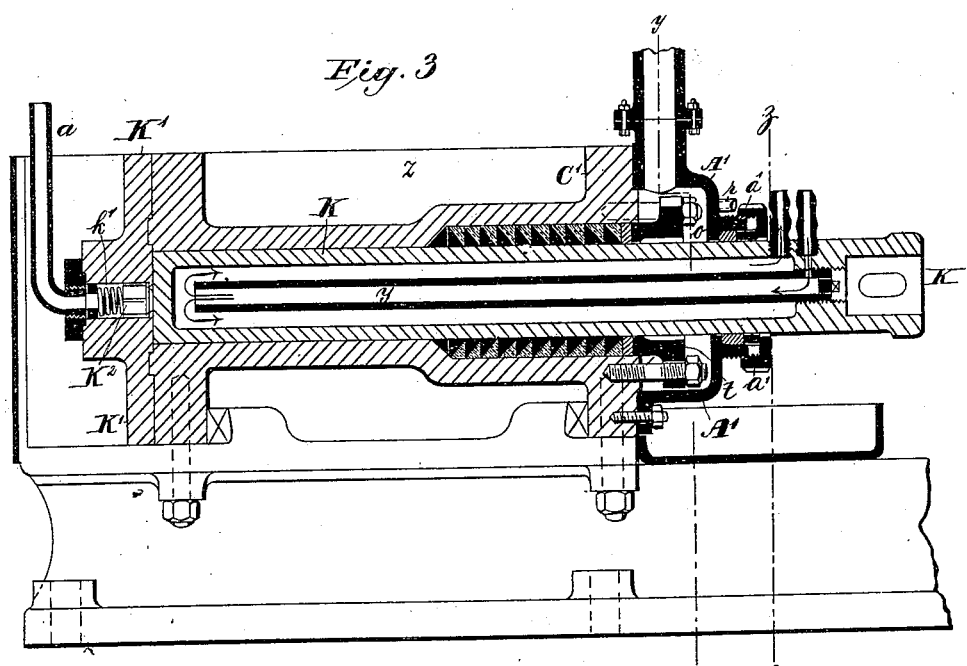

In the accompanying drawings, Figure 1 shows in elevation a general view of my improved ice-machine. Fig. 2 is a longitudinal vertical section of the pump on an enlarged scale. Fig. 3 is a like view, showing a slight modification in the construction of the stuffing-box. Figs. 4, 5, and 6 are vertical transverse sections, that shown in Fig. 4 being taken on line $xx$ of Fig. 2, and those shown in Figs. 5 and 6 on lines $yy$ and $zz$ of Fig. 3. Fig. 7 is a vertical transverse section of the condenser C, shown on an enlarged scale.

A indicates the compressing-pump; B, the condenser; C, the cooler; D, the refrigerator, and E the gas-holder for the reception of the waste gases from the stuffing-box of the compressing-pump A. These elements constitute the main parts of my improved ice-machine. The pump A is preferably surrounded by or inclosed in a cooling tank or jacket, $z$, to prevent the pump-piston K from being heated. I make the same hollow, and insert therein a pipe, $y$, through which and a branch, $x$, the water is admitted to the interior of the piston, from whence it escapes by pipe $u$. The stuffing-box chamber $o$ is in communication with a reservoir, $b$, that contains a suitable lubricator, through a pipe, $r$, bent into U-shape, and through a pipe, $h$, provided with a suitable stop-cock, $h'$, with the gas-holder E, so that the carbonic-acid gases that escape from the pump into the stuffing-box chamber are carried to and collected in the gas-holder.

Inasmuch as the pressure in $o$ does but slightly, if at all, exceed the normal atmospheric pressure, a stuffing-box gland of very simple or usual construction may be employed.

Instead of constructing the stuffing-box so as to form a gas and lubricant chamber, $o$, as shown in Fig. 1, a casing having a flange, $f$, may be bolted to the flange $C'$ of the pump-cylinder over the stuffing-box, whereby such a chamber $o$ would then be formed as shown in Figs. 3, 5, and 6. The said casing is connected by pipe $h$ with the gas-holder E, and by a U-pipe with the oil-reservoir $b$, as above set forth. Of course, when it becomes necessary to gain access to the stuffing-box to screw up the stuffing-box gland $t$, or for other purposes, the casing A' has to be removed, which may, however, be done very readily.

The casing A' is provided with an ordinary stuffing-box and stuffing-box gland, $a'$.

In the gas-holder E, I preferably employ oil or glycerine as a liquid seal.

The highly-heated carbonic acid compressed in pump A is ejected from the latter through a passage or port, $k'$, formed in the head $K'$ of the pump-cylinder, (said port being provided with a suitable check-valve, $K^2$, for obvious purposes,) and thence through pipe $a$ to the condenser B and its worm or coiled pipe, said condenser being of usual construction. From the latter the carbonic acid flows through pipe $c$ to the cooler C, (shown in section in Fig. 7;) thence through a coil of pipe or worm, $m$, and a pipe, $n$, into a central chamber, F.

As shown in Fig. 4, the carbonic acid enters the coil $m$ at top and flows at bottom into pipe $n$, in which it rises to flow into vessel or chamber F at the upper end thereof.

To the lower end of vessel F is connected a pipe, $d$, provided with a valve or stop-cock, $e$, Fig. 1, which pipe conducts the acid to the freezer or refrigerator, from which the vapors or gas, which are yet quite cold, return by pipe $f'$ to cooler C, and through the coil of pipe or worm $p$ thereof, which is arranged between chamber or vessel F and coil of pipe $m$, as shown in said Fig. 7. From the worm $p$ the carbonic-acid gas is drawn into pipe $g$, and thence into the pump and compressed. The cooler C is filled with a solution of salt, so that the cold gases passing through coil $p$, together with the salt solution, will abstract a considerable amount of heat from the fluid carbonic acid flowing through coil $m$ into vessel or chamber F, thereby materially reducing the temperature of the acid, and consequently its pressure. The use of the cooler also serves to reduce the work of compressing the gases to a minimum.

The carbonic-acid gas collected in the holder is returned to the pump for compression from time to time, and this may be effected in two ways, namely:

By closing cock $e$ to cut off the communication between the refrigerator D and the other parts of the apparatus, and reducing the pressure in pipe $g$ through pump A to that of the atmosphere, and then pumping the gas from holder E by opening stop-cock k in pipe i, which latter pipe penetrates into the gas-holder, as shown in Fig. 1. When all the gas has been pumped out of the holder, the cock k is again shut and that e opened.

Secondly, by withdrawing the gas from the holder E, without interrupting the function of the apparatus, by means of an injector, g, interposed in pipe i and operated by carbonic acid at high pressure—say about sixty atmospheres. The carbonic acid is fed to the injector through pipe v, (provided with a suitable stop-cock or valve, w,) branched upon pipe a. Of course, it will be understood that when the gas is exhausted from holder E, as last described, the communication between pipes i and g is to be cut off, and this may be effected by stop-cock l.

The charging of the apparatus with carbonic acid is effected by feeding carbonic acid under any desired pressure to the suction-chamber of the pump through a suitable valved port.

To compensate for the loss of carbonic acid, fluid carbonic acid is introduced and allowed to vaporize in the suction-chamber of the pump, where such acid is kept on hand. If, on the contrary, carbonic-acid gas is available only, it is fed into the gas-holder and then carried to the pump in one or the other ways described above.

I have described the apparatus and its operation or function in conjunction with carbonic acid, and have described the advantages derived from the use of said acid. It is obvious, however, that other highly-volatile liquids may be employed, such as ether, ammonia, &c.

Having now described my invention, what I claim is—

1. In machines of the class described, the arrangement for reducing the loss of gases at the stuffing-box of the compressing-pump, which consists in the combination of a lubricating-chamber, o, with the gas-holder E, through pipe h, in which gas-holder the gases escaping from the stuffing-box are collected, and from which they are withdrawn through pump A, either by suction after cutting the refrigerator out of the gas-circuit, or by the use of an injector operated by carbonic acid under high pressure or tension.

2. In machines of the class described, a storage-chamber for storing the working-fluid interposed in the connection between the refrigerator and condenser to cool the stored working-fluid through the medium of the gases as they pass from the refrigerator to the condenser, for the purpose of maintaining the pressure in the apparatus at as low a degree as possible, and thereby reduce the expenditure of power, substantially as described.

3. In machines of the class described, in which carbonic acid is employed as a refrigerant, the arrangement described and shown, and characterized by the compressing-pump A, condenser B, cooler C, refrigerator D, and gas-holder E.

4. In machines of the class described, a cooler and a storage-chamber arranged therein interposed in the connection between the refrigerator and condenser to cool the stored working-fluid through the medium of the gases as they pass from the refrigerator to the condenser, and to cool said gases simultaneously, thereby reducing the pressure in the machine to a minimum and effecting a saving of the motive power, substantially as described.

In testimony whereof I affix my signature in presence of two witnesses.

ALBERT SCHMITZ.

Witnesses:
HEINRICH LIPPER,
HERMANN KUHFUS.